Patented Nov. 26, 1940

2,222,973

UNITED STATES PATENT OFFICE 2,222,973

ART OF INCREASING FADING RESISTANCE OF DYESTUFFS

Johan Bjorksten, Chicago, Ill., assignor to Ditto, Incorporated, Chicago, Ill., a corporation of West Virginia No Drawing. Application February 7, 1938, Serial No. 189,171

9 Claims. (Cl. 101—149.5)

This invention relates to the art of increasing the fade resistance of dyestuffs. More particularly, it relates to material having, uniformly distributed on its surface, a substance which will retard the fading of dyestuffs.

A preferred embodiment of this invention comprises a copy sheet suitable for use in duplicating processes, having associated therewith a substance which will retard the fading of dyestuffs used in duplicating inks.

I have discovered that aerogels have the property of retarding the fading of dyestuffs, and particularly the water and alcohol soluble dyestuffs commonly used in duplicating inks. The aerogel which I prefer to use is a silica aerogel.

The preparation of aerogels and the description of their properties is given in an article by S. S. Kistler and A. C. Caldwell, "Industrial and Engineering Chemistry," Vol. 126, page 658 (1934) and also in U. S. Patent to Kistler, No. 2,093,454, issued September 21, 1937. From these publications it will be apparent that the aerogels are characterized by the fact that they are formed from colloidal gels in which the liquid menstruum is removed, at least in part, by heating the liquid under pressure beyond its critical temperature, and subsequently releasing the liquid thus heated. In this manner it is possible to produce a skeleton of the solid component of the gel as it actually exists before treatment and differing only in that the liquid medium is displaced by a vapor or gas.

In the practice of my invention, I may associate the aerogel in various manner with a substance on which the dyestuff is to be applied. I may incorporate the aerogel uniformly in the substance so that the aerogel is also uniformly distributed on the surface. I may also coat the surface of the substance with any type of coating solution containing aerogel.

The aerogel may be associated with various materials to which a dye may be applied, including textiles and paper.

My invention is particularly applicable to the preparation of copy sheets suitable for use in duplicating processes. As an example of this application of the invention, the following is given:

One part of silica aerogel and five parts of water are ground together, to a thick paste. This paste is applied to sheets of paper which are used as copy sheets in practicing the hectograph process of duplication or in practicing a process wherein the copy sheets are pressed against master sheets to duplicate data thereon, the ink or carbon on the master sheets being moistened with a solvent for the ink or carbon.

It was found that the design reproduced on the aerogel coated copy sheet was highly resistant to fading in light. For example, seven and one-half hours exposure to intense ultra-violet light caused no appreciable fading, while a design on untreated copy paper faded completely under identical conditions.

While I have shown and described certain embodiments of my invention, it is to be understood that it is capable of many modifications. Changes, therefore, may be made without departing from the spirit and scope of the invention as described in the appended claims; in which it is my intention to claim all novelty inherent in my invention as broadly as possible, in view of the prior art.

I claim:

1. A copy paper adapted for use in a transfer process and designed to receive and retain color impressions of increased fastness to light by contact with a configuration of an aqueous or alcohol soluble dye susceptible to fading in light, comprising a sheet of copy paper having a silica aerogel uniformly distributed over the contact surface, said aerogel being adapted to interact with a water or alcohol soluble dye to produce an improved dye having an increased fastness to light.

2. Paper having an aerogel uniformly distributed on its surface, and a design on said surface formed from an aqueous or alcohol soluble dye which is susceptible to fading in light, said aerogel being adapted to interact with the water or alcohol soluble dye to produce an improved dye having increased fastness to light.

3. The method of making transfer copies containing a design which is highly resistant to fading in light, comprising applying a copy sheet containing aerogel on its surface to a surface having a design formed thereon from a water or alcohol soluble dye and thereby transferring a portion of the dye to said copy sheet to form a design thereon, whereby the dye and aerogel coact to render the dye on the copy sheet resistant to fading in light.

4. The method of making transfer copies containing a design which is highly resistant to fading in light, comprising applying a copy sheet containing silica aerogel on its surface to a surface having a design formed thereon from a water or alcohol soluble dye and thereby transferring a portion of the dye to said copy sheet to form a design thereon, whereby the dye and silica aerogel coact to render the dye on the copy sheet resistant to fading in light.

5. An article of manufacture having an aerogel uniformly distributed on a surface thereof, and a water or alcohol soluble dyestuff which is susceptible to fading in sunlight on said surface adapted to interact with said aerogel whereby increased resistance of the dye to fading in sunlight is attained.

6. A fabric having an aerogel uniformly distributed on a surface thereof, and a water or alcohol soluble dyestuff which is susceptible to fading in sunlight on said surface adapted to interact with said aerogel whereby increased resistance of the dye to fading in sunlight is attained.

7. The method of increasing the fade resistance of water and alcohol soluble dyes in the form of designs, characters or the like carried by an article of manufacture which comprises applying the dyestuff to the article having an aerogel uniformly distributed over the contact surface thereof.

8. The method of increasing the fade resistance of water and alcohol soluble dyes in the form of designs, characters or the like carried by a fabric which comprises applying the dyestuff to the fabric having an aerogel uniformly distributed over the contact surface thereof.

9. The method of increasing the fade resistance of water and alcohol soluble dyes in the form of designs, characters or the like carried by paper which comprises applying the dyestuff to the paper having an aerogel uniformly distributed over the contact surface thereof.

JOHAN BJORKSTEN.